US012606680B2

(12) United States Patent
Ünal et al.

(10) Patent No.: US 12,606,680 B2
(45) Date of Patent: Apr. 21, 2026

(54) SINGLE-LAYER OR MULTILAYER POLYESTER FILM HAVING A PERMANENT ANTI-FOG COATING AND A TRANSPARENCY OF AT LEAST 92 %

(71) Applicant: Mitsubishi Polyester Film GmbH, Wiesbaden (DE)

(72) Inventors: Alper Ünal, Mainz (DE); Claudia Lohre, Wiesbaden (DE); Petr Kolar, Eschborn (DE); Thiemo Herbst, Mainz (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 17/501,107

(22) Filed: Oct. 14, 2021

(65) Prior Publication Data

US 2022/0119604 A1      Apr. 21, 2022

(30) Foreign Application Priority Data

Oct. 16, 2020    (DE) ......................... 102020213101.5

(51) Int. Cl.
| | |
|---|---|
| *C08J 5/18* | (2006.01) |
| *A01G 9/14* | (2006.01) |
| *B29C 48/00* | (2019.01) |
| *B29C 48/08* | (2019.01) |
| *B29C 48/154* | (2019.01) |
| *B29C 55/12* | (2006.01) |
| *B29K 67/00* | (2006.01) |
| *B32B 7/023* | (2019.01) |
| *B32B 27/08* | (2006.01) |
| *B32B 27/18* | (2006.01) |
| *B32B 27/20* | (2006.01) |
| *B32B 27/30* | (2006.01) |
| *B32B 27/36* | (2006.01) |
| *C08J 7/04* | (2020.01) |
| *C08J 7/054* | (2020.01) |
| *C08J 7/056* | (2020.01) |
| *C08L 29/04* | (2006.01) |
| *C08L 33/06* | (2006.01) |
| *C09D 7/61* | (2018.01) |
| *C09D 7/65* | (2018.01) |

(Continued)

(52) U.S. Cl.
CPC .............. *C08J 5/18* (2013.01); *A01G 9/1438* (2013.01); *B32B 7/023* (2019.01); *B32B 27/08* (2013.01); *B32B 27/18* (2013.01); *B32B 27/20* (2013.01); *B32B 27/306* (2013.01); *B32B 27/36* (2013.01); *C08J 7/0427* (2020.01); *C08J 7/054* (2020.01); *C09D 129/04* (2013.01); *B29C 48/0018* (2019.02); *B29C 48/08* (2019.02); *B29C 48/154* (2019.02); *B29C 55/12* (2013.01); *B29K 2067/00*

(2013.01); *B29K 2995/0026* (2013.01); *B32B 2250/24* (2013.01); *B32B 2250/244* (2013.01); *B32B 2255/10* (2013.01); *B32B 2255/26* (2013.01); *B32B 2305/30* (2013.01); *B32B 2307/40* (2013.01); *B32B 2307/412* (2013.01); *B32B 2307/418* (2013.01); *B32B 2307/71* (2013.01); *B32B 2307/728* (2013.01); *B32B 2329/04* (2013.01); *B32B 2367/00* (2013.01); *B32B 2410/00* (2013.01); *C08J 7/056* (2020.01); *C08J 2300/12* (2013.01); *C08J 2333/04* (2013.01); *C08J 2367/02* (2013.01); *C08J 2400/14* (2013.01); *C08J 2429/04* (2013.01); *C08L 29/04* (2013.01); *C08L 33/06* (2013.01); *C09D 7/61* (2018.01); *C09D 7/65* (2018.01); *C09D 133/06* (2013.01); *Y10T 428/31786* (2015.04); *Y10T 428/31797* (2015.04)

(58) Field of Classification Search
None
See application file for complete search history.

(56) References Cited

U.S. PATENT DOCUMENTS

| | | | | | |
|---|---|---|---|---|---|
| 4,270,308 | A | * | 6/1981 | Mitsuishi ............. | A01G 9/1438 47/17 |
| 4,478,909 | A | * | 10/1984 | Taniguchi ........ | B29D 11/00865 428/428 |

(Continued)

FOREIGN PATENT DOCUMENTS

| | | |
|---|---|---|
| DE | 698 33 711 | 9/2006 |
| EP | 0 144 948 A2 | 6/1985 |

(Continued)

OTHER PUBLICATIONS

J. A. Woollam et al, Overview of variable-angle spectroscopic ellipsometry (VASE): I. Basic theory and typical applications, Proc. SPIE vol. CR72, Optical Metrology, Ghanim A. Al-Jumaily; Ed. pp. 3-28, 1999.

*Primary Examiner* — Vivian Chen
(74) *Attorney, Agent, or Firm* — ProPat, LLC; Cathy Moore

(57) ABSTRACT

The present invention relates to a single-layer or multilayer coated polyester film having a transparency of at least 92%, with the polyester film having a first surface and a second surface, in which a permanent anti-fog coating has been applied to at least one of the surfaces of the polyester film and the anti-fog coating includes at least one water-soluble polymer, an inorganic, hydrophilic material and a cross-linker. The water-soluble polymer is a polyvinyl alcohol or a hydrophilic polyvinyl alcohol copolymer. Furthermore, the present invention relates to production processes for the coated polyester film and to energy saving mats in greenhouses produced therefrom.

27 Claims, No Drawings

(51) Int. Cl.
    *C09D 129/04*     (2006.01)
    *C09D 133/06*     (2006.01)

(56)         References Cited

U.S. PATENT DOCUMENTS

| | | | | |
|---|---|---|---|---|
| 4,571,363 | A * | 2/1986 | Culbertson | G03C 1/93 |
| | | | | 428/483 |
| 5,075,133 | A * | 12/1991 | Hosono | C09D 5/00 |
| | | | | 427/164 |
| 5,262,475 | A * | 11/1993 | Creasy | C08J 3/246 |
| | | | | 525/203 |
| 5,688,855 | A * | 11/1997 | Stoy | C09D 175/04 |
| | | | | 524/378 |
| 5,855,860 | A * | 1/1999 | Nishimine | C01B 33/183 |
| | | | | 423/337 |
| 6,306,932 | B1 * | 10/2001 | Yamamoto | C09D 133/02 |
| | | | | 524/394 |
| 10,472,480 | B2 * | 11/2019 | Kliesch | B29C 48/08 |
| 2002/0065346 | A1 * | 5/2002 | Murschall | B32B 27/18 |
| | | | | 524/323 |
| 2003/0004237 | A1 * | 1/2003 | Murschall | B32B 27/08 |
| | | | | 428/480 |
| 2003/0180549 | A1 * | 9/2003 | Noguchi | C01B 33/1465 |
| | | | | 428/446 |
| 2006/0078718 | A1 * | 4/2006 | Konrad | C09D 139/06 |
| | | | | 524/502 |
| 2006/0167153 | A1 * | 7/2006 | Schneider | C08K 5/06 |
| | | | | 524/376 |
| 2007/0087188 | A1 * | 4/2007 | Konrad | C08J 7/054 |
| | | | | 428/521 |
| 2009/0233077 | A1 * | 9/2009 | Advincula | C09D 7/67 |
| | | | | 977/773 |
| 2010/0035039 | A1 * | 2/2010 | Jing | G02B 1/10 |
| | | | | 524/265 |
| 2011/0008635 | A1 * | 1/2011 | Kliesch | C08J 5/18 |
| | | | | 428/480 |
| 2011/0274912 | A1 * | 11/2011 | Nakao | A01G 13/0275 |
| | | | | 427/373 |
| 2011/0274914 | A1 * | 11/2011 | Nakao | C09D 7/61 |
| | | | | 977/773 |
| 2013/0224478 | A1 * | 8/2013 | Jing | C08J 7/08 |
| | | | | 106/287.16 |
| 2015/0218351 | A1 * | 8/2015 | Jing | C09D 5/00 |
| | | | | 428/428 |
| 2016/0121365 | A1 * | 5/2016 | Armstrong | C09D 5/1693 |
| | | | | 428/317.9 |
| 2017/0208752 | A1 * | 7/2017 | Lohre | B29C 48/022 |
| 2017/0342226 | A1 * | 11/2017 | Kliesch | C09D 5/006 |
| 2019/0055410 | A1 * | 2/2019 | Iseda | C09D 1/00 |
| 2019/0056529 | A1 * | 2/2019 | Zhu | B29D 11/00865 |
| 2019/0077137 | A1 * | 3/2019 | Lohre | B32B 27/36 |
| 2020/0061897 | A1 * | 2/2020 | Konrad | B32B 37/06 |
| 2020/0079921 | A1 * | 3/2020 | Lohre | C09D 7/61 |
| 2020/0205353 | A1 * | 7/2020 | Holgerson | C09D 133/12 |
| 2020/0315102 | A1 * | 10/2020 | Holgerson | A01G 9/22 |
| 2022/0322615 | A1 * | 10/2022 | Washiya | A01G 9/16 |
| 2023/0061460 | A1 * | 3/2023 | Takei | C09K 3/18 |
| 2023/0122289 | A1 * | 4/2023 | Felder | C09D 5/1618 |
| | | | | 556/410 |
| 2023/0397543 | A1 * | 12/2023 | Asplund | C09D 7/63 |

FOREIGN PATENT DOCUMENTS

| | | | |
|---|---|---|---|
| EP | 0 769 540 A2 | | 4/1997 |
| EP | 1 047 551 A2 | | 11/2000 |
| EP | 1 520 027 A1 | | 11/2001 |
| EP | 1 232 058 A1 | | 8/2002 |
| EP | 1 534 776 A1 | | 6/2005 |
| EP | 1 647 568 B1 | | 1/2009 |
| EP | 2 216 362 A1 | | 2/2010 |
| EP | 1 777 251 B1 | | 3/2012 |
| EP | 3 456 762 A2 | | 3/2019 |
| EP | 3 613 592 A1 | | 2/2020 |
| JP | 2005-314495 A | * | 11/2005 |
| WO | 1995/018210 A1 | | 7/1995 |
| WO | WO 2009/144999 A | * | 3/2009 |
| WO | WO 2022/079229 A | * | 4/2022 |

* cited by examiner

SINGLE-LAYER OR MULTILAYER POLYESTER FILM HAVING A PERMANENT ANTI-FOG COATING AND A TRANSPARENCY OF AT LEAST 92 %

CROSS-REFERENCE TO RELATED APPLICATIONS

This application claims priority to German Patent Application 10 2020 213 101.5 filed Oct. 16, 2020, which is hereby incorporated herein by reference in its entirety.

FIELD OF THE INVENTION

The invention relates to a single-layer or multilayer, highly transparent, biaxially oriented, UV-stable polyester film which is provided on at least one side with a permanent anti-fog coating. The film of the invention is suitable for producing greenhouse shading mats and has specific transparency properties, permanent anti-fog properties and a high UV stability. The invention further relates to a process for producing the polyester film of the invention and also to its use in greenhouses.

BACKGROUND OF THE INVENTION

Films for greenhouse shading mats in greenhouses have to fulfill a number of requirements. In the photosynthetic wavelength range, a high light transparency has to be ensured since this is required by the plants for optimal plant growth. The light transparency should if possible not be impaired under weather conditions under which condensate water is formed on the shading mats.

The term anti-fog is used to describe water droplets on the surface of transparent polymer films. Owing to the typically high atmospheric humidity in greenhouses, condensate water is formed as water droplets, especially on the surface of the side of greenhouse shading mats facing the plants, under certain weather conditions (e.g. temperature differences between day and night). Apart from weather conditions, the different surface tension of water and polymer promotes condensate water formation. Films having anti-fog properties prevent the formation of water droplets and allow fog-free visibility through the polymer film.

In general, anti-fog additives can be incorporated into the polymer matrix during the extrusion process or be applied as coating to the polymer matrix. Such anti-fog additives are generally divalent compounds which have a nonpolar aliphatic region for anchoring to the polymer matrix and a polar hydrophilic region which can interact with water and reduces the surface tension of the water droplets so that a continuous transparent water film (owing to a hydrophilic surface) is formed on the film surface. The use of anti-fog additives should not adversely affect the passage of light through and thus the transparency of the greenhouse films so as not to reduce the yield at harvest. In contrast to a liquid film, the water droplets scatter light strongly and increase reflection, which leads to significantly decreased photosynthesis, especially in the low-light morning hours. Furthermore, fungal rot on plants and plant parts is avoided by water droplets which do not adhere and drop down and scorching of plants and plant parts due to droplets which on the film surface function as a focusing lens on incidence of light is reduced. In the event of droplet formation nevertheless occurring in the case of very severe condensate water formation, the anti-fog component must not contain any toxic or particularly environmentally damaging substances.

Undesirable substances include, in particular, alkylphenol ethoxylates which are frequently used in anti-fog systems (e.g. WO 1995018210).

Furthermore, it would be desirable for the greenhouse film to be UV-stable so as to allow the shading mat to be used in a greenhouse for at least 5 years without displaying significant yellowing, embrittlement or crack formation on the surface and suffering a serious impairment of the mechanical properties or a significant loss of transparency.

Polyester films having various transparent anti-fog coatings are known. Thus, for example, interface-active coatings based on hydrophilic water-soluble polymers and/or surfactants are used for coating the surfaces of polymer films in order to achieve an anti-fog effect.

A fundamental problem associated with water-soluble polymers and/or surfactants is the ease with which the coating is washed off, as a result of which a permanent anti-fog action cannot be realized. Customary polyester films having an anti-fog coating are described in EP 1647568 B1 and EP 1777251 B1. These polyester films have good mechanical properties but display a relatively low transparency. Furthermore, they have a relatively low long-term stability under weathering. In addition, the anti-fog effect of these polyester films has a short life of a few months since the corresponding anti-fog additives wash off easily and are soluble in water, so that the active substance is quickly consumed during use as greenhouse shading mat. EP 1152027 A1, EP 1534776 A1 and EP 2216362 A1 describe polyolefin films based on LDPE or films based on PVC and EVA having lasting anti-fog properties for food packaging and for greenhouse applications using anti-fog additives based on inorganic hydrophilic colloidal substances (colloidal silicon, aluminum and the like) and nonionic, anionic or cationic surface-active additives. Although these display permanent anti-fog properties, they have greatly decreased mechanical properties compared to polyester-based greenhouse shading mats. The use of polyolefin-based films can categorically be ruled out for the target application since the desired long-term stability and consequently the life of 5 years cannot be realized because of the faster UV degradation of polyethylene (PE) compared to polyethylene terephthalate (PET), as a result of which the economics thereof are adversely affected. In addition, the poorer mechanical stability of the polyolefins leads to the shading mats contorting and losing their largely closed structure, which leads to a decreased insulating effect.

EP 3456762 A2 discloses a polyester film having a permanent anti-fog coating based on porous material, an organic crosslinker based on polymer, an organofunctional silane and one or more surfactants, which film is suitable for further processing as shading mat. The anti-fog properties of these films are good in respect of permanence and the achievable transparency is in the desired range. Nevertheless, these films are capable of improvement in terms of the quality of the anti-fog effect, especially at relatively high coating thicknesses. Furthermore, the use of organofunctional silanes is problematical and undesirable for regulatory reasons, so that this solution likewise has to be ruled out.

The films according to the prior art are disadvantageous because the anti-fog properties are not long-lasting or because the anti-fog coating is applied to the films in an additional process step. Furthermore, the polyester films according to the prior art are disadvantageous because they do not have a sufficient permanent anti-fog coating in combination with a high transparency and long-term stability.

It was an object of the present invention to produce a polyester film which has permanent anti-fog properties combined with a high transparency of at least 92% and a UV stability of at least 5 years without yellowing significantly or displaying embrittlement or crack formation on the surface and impairment of the mechanical and optical properties which are critical for the use. The film should also be able to be produced economically on existing polyester film plants, single-layer or multilayer plants, in the thickness range from 10 to 40 μm.

SUMMARY OF ADVANTAGEOUS EMBODIMENTS OF THE INVENTION

The object is achieved by provision of a single-layer or multilayer coated polyester film having a transparency of at least 92%, with the polyester film having a first surface and a second surface, wherein a permanent anti-fog coating has been applied to at least one of the surfaces of the polyester film and the anti-fog coating comprises at least one water-soluble polymer, an inorganic, hydrophilic material and a crosslinker, wherein the water-soluble polymer is a polyvinyl alcohol (PVOH) or a hydrophilic polyvinyl alcohol copolymer.

DETAILED DESCRIPTION OF ADVANTAGEOUS EMBODIMENTS OF THE INVENTION

The polyester film according to the invention comprises a base layer (B) having a first surface and a second surface. The polyester film according to the invention can additionally comprise a covering layer (A) which has been applied to the first surface or the second surface of the polyester film. Furthermore, the polyester film according to the invention can additionally comprise a further covering layer (C), with the covering layer (C) having been applied to the surface of the polyester film opposite the covering layer (A).

The polyester film of the invention consists of polyester, additives and at least one coating.

The base layer (B) preferably comprises at least 70% by weight of thermoplastic polyester. Polyesters derived from ethylene glycol and terephthalic acid (=polyethylene terephthalate, PET), from ethylene glycol and naphthalene-2,6-dicarboxylic acid (=polyethylene 2,6-naphthalate, PEN), from 1,4-bis(hydroxymethyl)cyclohexane and terephthalic acid [=poly(1,4-cyclohexanedimethylene terephthalate), PCDT] or from ethylene glycol, naphthalene-2,6-dicarboxylic acid and biphenyl-4,4'-dicarboxylic acid (=polyethylene 2,6-naphthalate bibenzoate, PENBB) are suitable for this purpose. Particular preference is given to polyesters which comprise or consist to an extent of at least 90 mol %, preferably at least 95 mol %, of ethylene glycol and terephthalic acid units or of ethylene glycol and naphthalene-2,6-dicarboxylic acid units. In a particularly preferred embodiment, the layer consists of polyethylene terephthalate homopolymer.

Suitable other aliphatic diols are, for example, diethylene glycol, triethylene glycol, aliphatic glycols of the general formula $HO—(CH_2)_n—OH$, where n is an integer from 3 to 6 (in particular 1,3-propanediol, 1,4-butanediol, 1,5-pentanediol and 1,6-hexanediol) or branched aliphatic glycols having up to 6 carbon atoms. Among cycloaliphatic diols, mention may be made of cyclohexanediols (in particular cyclohexane-1,4-diol). Suitable other aromatic diols correspond, for example, to the formula $HO—C_6H_4—X—C_6H_4—OH$, where X is $—CH_2—$, $—C(CH_3)_2—$, $—C(CF_3)_2—$, $—O—$, $—S—$ or $—SO_2—$. In addition, bisphenols of the formula $HO—C_6H_4—C_6H_4—OH$ are also well-suited.

Suitable other aromatic dicarboxylic acids are preferably benzene dicarboxylic acids, naphthalene dicarboxylic acids (for example naphthalene-1,4- or -1,6-dicarboxylic acid), biphenyl-x,x'-dicarboxylic acids (in particular biphenyl-4, 4'-dicarboxylic acid), diphenylacetylene-x,x'-dicarboxylic acids (in particular diphenylacetylene-4,4'-dicarboxylic acid) or stilbene-x,x'-dicarboxylic acids. Among cycloaliphatic dicarboxylic acids, mention may be made of cyclohexane dicarboxylic acids (in particular cyclohexane-1,4-dicarboxylic acid). Among aliphatic dicarboxylic acids, the (C3-C19)-alkanediacids are particularly suitable, with the alkane part being able to be linear or branched. Among heterocyclic dicarboxylic acids, particular mention may be made of furan-2,5-dicarboxylic acid.

For the purposes of the present invention, a layer is a polymer layer which is formed by means of coextrusion. This means that the polyester film according to the present invention is formed by one or more layer(s).

For the purposes of the present invention, a coating is the drying product of an aqueous dispersion applied to the polyester film and not part of the extrusion process for the polyester film per se.

Any additional covering layers (A) and (C) present on the film preferably likewise consist of a polyester as has been described above, with the composition being identical to or different from the above-described base layer.

The production of the polyesters can, for example, be carried out by the transesterification process. Here, dicarboxylic esters and diols are used as starting materials and are reacted in the presence of the customary transesterification catalysts, e.g. zinc, calcium, lithium, magnesium and manganese salts. The intermediates are then polycondensed in the presence of generally customary polycondensation catalysts such as antimony trioxide or titanium salts. Production of the polyesters can likewise readily be carried out by the direct esterification process in the presence of polycondensation catalysts. This production method starts out directly from the dicarboxylic acids and the diols.

The film according to the invention contains particles in order to achieve a certain roughness of the surface and enable the film to be rolled up easily.

Particles which can be used are, for example, calcium carbonate, amorphous silica, talc, magnesium carbonate, barium carbonate, calcium sulfate, barium sulfate, lithium phosphate, calcium phosphate, magnesium phosphate, aluminum oxide, LiF, calcium salts, barium salts, zinc salts or manganese salts of the dicarboxylic acids used, titanium dioxide, kaolin or particulate polymers such as crosslinked polystyrene or acrylate particles. Preference is given to using amorphous silica as particles. The particles are preferably used in a concentration of less than 0.5% by weight, based on the total weight of the film. Further particles which influence the surface properties and rheological properties of the film are preferably not present in the film of the invention.

If the film has a multilayer structure, the particles can be present in all layers, preferably in the covering layers.

An advantage of the present invention is that the anti-fog coating used according to the invention is free of adhesion-promoting organofunctional silanes. Adhesion-promoting organofunctional silanes are, for example, vinyltrimethoxysilane, vinyltriethoxysilane, γ-meth-acryloxypropylt-rimethoxysilane or γ-glycidoxypropyltrimethoxysilane. Such silanes are suspected of having a carcinogenic action and should therefore be avoided.

The film also has to have a low transmission in the wavelength range from <370 nm to 300 nm. This transmission is less than 40%, preferably less than 30% and particularly preferably less than 15% (for method, see measurement methods), at any wavelength in the range indicated. In this way, the film is protected against embrittlement and yellowing, and the plants and installations in the greenhouse are protected against UV light in this way. At from 390 to 400 nm, the transparency is greater than 20%, preferably greater than 30% and particularly preferably greater than 40%, since this wavelength range is already significantly photosynthesis-active and plant growth would be adversely affected at too great a degree of filtering in this wavelength range. The low UV transparency is achieved by the addition of an organic UV stabilizer. A low transparency for UV light protects any flame stabilizer which is likewise present against rapid decomposition and a high degree of yellowing. The organic UV stabilizer is selected from the group consisting of triazines, benzotriazoles or benzoxazinones. Particular preference is given here to triazines, partly because they have good thermal stability and low outgassing from the film at the processing temperatures of 275-310° C. customary for PET. 2-(4,6-Diphenyl-1,3,5-triazin-2-yl)-5-(hexyl)oxyphenol (e.g. TINUVIN® 1577, BASF) or 2-(2'-hydroxyphenyl)-4,6-bis(4-phenylphenyl)triazine (e.g. Tinuvin™ 1600, BASF) is particularly suitable. If these are used, the preferred low transparency values of below 370 nm can be attained at relatively low stabilizer concentrations, with a relatively high transparency at wavelengths above 390 nm being achieved at the same time.

The film, or in the case of a multilayer film all film layers, contain at least one organic UV stabilizer. In a preferred embodiment, UV stabilizers are added to the covering layer (s) or the monofilm in amounts of from 0.3 to 3% by weight, based on the weight of the respective layer. Particular preference is given to a UV stabilizer content in the range from 0.75 to 2.8% by weight. The covering layers ideally contain from 1.2 to 2.5% by weight of UV stabilizer. In the multilayer embodiment of the film, not only the covering layers but preferably also the base layer contain a UV stabilizer, with the content of UV stabilizer in % by weight in this base layer preferably being less than that in the covering layer(s). These indicated contents in the covering layer(s) relate to triazine derivatives. If a UV stabilizer from the group of benzotriazoles or benzoxazinones is used as a complete or partial replacement for a triazine derivative, the replaced part of the triazine component has to be replaced by 1.5 times the amount of a benzotriazole or benzoxazinone component.

The polyester film can contain further stabilizers, for example phosphorus compounds such as phosphoric acid and derivatives thereof, e.g. phosphoric esters, or phosphonic acid and derivatives thereof, e.g. phosphonic esters, so that the film has a reduced flammability.

The total thickness of the polyester film of the invention can vary within particular limits. The total thickness is from 10 to 40 μm, preferably from 14 to 23 μm, particularly preferably from 14.5 to 20 μm, with the layer B (=base layer) of the multilayer variant making up a proportion of preferably from 60 to 90% of the total thickness. The proportion of the base layer of the three-layer embodiment in the total film thickness is preferably at least 60%, particularly preferably at least 70% and very particularly preferably at least 75%.

In one embodiment, the film has a three-layer structure and has a covering layer (A) on one side of the layer (B) (=base layer) and a further covering layer (C) on the other side of the layer (B). In this case, the two layers (A) and (C) form the covering layers (A) and (C). The anti-fog coating can be applied to the covering layer (A) and/or covering layer (C). A three-layer structure makes it possible to obtain a film having a good transparency, due to the layer (B) containing no further particles apart from those introduced by addition of recycled material derived from the same type of polyester film. In this way, the proportion of recirculated recycled material can be increased, which leads to particularly economical film production. The term recycled material derived from the same type of polyester film refers to film residues/scrap which arise during the film production process (e.g. seam strips), and these can either be recirculated directly during production or firstly be collected and subsequently added in the production of the layer (B).

The proportion of the recirculated, recycled polyester material should be as great as possible, as long as the above-described, inventive film properties are not impaired. In the film of the invention, the proportion of recycled polyester material in the base layer (B) can be 0-60% by weight, preferably 0-50% by weight and particularly preferably 0-40% by weight, based on the total weight of the film.

Apart from recycled material derived from the same type of polyester film, it is also possible to use polyester raw materials which have gone through a recycling process. Since recycled polyester raw materials can originate from many sources and have a variety of raw material qualities, it is important to permit only sources which allow a minimum degree of sorting purity. In this context, it has been found that films which are suitable as basis for the film of the invention can be produced surprisingly well using PCR material. The transparency of the film then experiences a slight decrease, while the turbidity can increase slightly because of the small amount of possible impurities. It is surprising that the decrease in transparency, which is, as described further below, a critical parameter of the film of the invention, is less than expected, presumably due to a levelling side effect of the permanent anti-fog coating. PCR material (post-consumer reclaim material) is a term for raw materials which are obtained by recycling from used products which have previously been used by a customer.

The film of the invention has a transparency of at least 92%, and is preferably 93%, particularly preferably 94% and ideally at least 94.5%. The higher the transparency, the better is plant growth in the greenhouse assisted.

The transparency according to the invention is achieved by the permanent anti-fog coating present on at least one side.

Coating and Covering Layer Modifications

In one embodiment, the polyester film is provided on one side with an anti-fog coating. Here, the anti-fog coating described below has to have a lower refractive index than the polyester film. The refractive index of the anti-fog coating at a wavelength of 589 nm in the machine direction of the film is below 1.64, preferably below 1.60 and ideally below 1.58. Furthermore, the dry layer thickness of the anti-fog coating has to be at least 60 nm, preferably at least 70 nm and in particular at least 80 nm, and not more than 150 nm, preferably not more than 130 nm and ideally not more than 120 nm. An ideal increase in transparency in the desired wavelength range is achieved thereby. Below a layer thickness of 60 nm, the anti-fog coating no longer contributes sufficiently to the increase in transparency. If the dry layer thickness according to the invention of a maximum of 150 nm is exceeded, the additional thickness does not lead to any further increase in transparency. Furthermore, the economics of the film are adversely affected because of the higher consumption of coating.

In a further embodiment, the anti-fog coating has a dry layer thickness of at least 30 nm and preferably at least 40 nm and particularly preferably at least 50 nm and is not more than <60 nm. The permanent anti-fog effect according to the invention is achieved thereby. In order to achieve the transparency values according to the invention of at least 92%, this embodiment has to have an antireflection modification on the surface of the polyester film opposite the anti-fog coating. This antireflection modification can be formed either by an antireflection coating or by a covering layer modification having a lower refractive index than polyethylene terephthalate.

If the antireflection modification is formed by an antireflection coating, this coating has a lower refractive index than the polyester film. The refractive index of the antireflection coating at a wavelength of 589 nm in the machine direction of the film is in this case below 1.64, preferably below 1.60 and ideally below 1.58. Polyacrylates, silicones and polyurethanes and also polyvinyl acetate are particularly suitable. Suitable acrylates are described, for example, in EP-A-0 144 948 and suitable silicones are described, for example, in EP-A-0 769 540. Particular preference is given to coatings based on polyacrylate or on polyurethane since these do not tend to sweating-out of coating components or flaking of parts of the coating in the greenhouse, which tends to be the case for coatings based on silicone.

The antireflection coating preferably contains less than 10% by weight, particularly preferably less than 5% by weight and very particularly preferably less than 1% by weight, of repeating units which contain an aromatic structural element. Above a proportion of 10% by weight of repeating units having an aromatic structural element, significant impairment of the weathering stability of the coating occurs. The antireflection coating particularly preferably contains at least 1% by weight (based on the dry weight) of a UV stabilizer, with particular preference being given to Tinuvin 479 or Tinuvin 5333-DW. HALS (hindered amine light stabilizers) are less preferred since these lead to significant yellowing of the material and thus to a reduction in transparency in the event of recycling (recirculation of film residues from production).

The thickness of the antireflection coating is at least 60 nm, preferably at least 70 nm and in particular at least 80 nm, and is not more than 130 nm, preferably not more than 115 nm and ideally not more than 110 nm. An ideal increase in transparency in the desired wavelength range is achieved in this way. In a preferred embodiment, the thickness of the antireflection coating is more than 87 nm and particularly preferably more than 95 nm. In this preferred embodiment, the thickness of the coating is preferably less than 115 nm and ideally below 110 nm. In this narrow thickness range, the transparency increase is close to the optimum and at the same time the reflection of the UV and blue regions of light is increased compared to the remainder of the visible spectrum in this range. This firstly saves UV stabilizer but first and foremost leads to a shift in the blue/red ratio in favor of the proportion of red. Improved plant growth and increased setting of flowers and fruit are achieved thereby.

If the antireflection modification is formed by a covering layer modification, the covering layer modification is formed by coextrusion on the base layer B and is located on the side of the film opposite the anti-fog coating. In this case, this layer has to consist of a polyester which has a lower refractive index than the polyester of the base layer B. The refractive index at a wavelength of 589 nm in the machine direction of the covering layer applied by coextrusion is below 1.70, preferably below 1.65 and particularly preferably below 1.60. This refractive index is achieved by the polymer containing a comonomer proportion of at least 2 mol %, preferably at least 3 mol % and ideally at least 6 mol %. Below 2 mol %, the values according to the invention for the refractive index cannot be achieved. The comonomer proportion is below 20 mol %, particularly preferably below 18 mol % and particularly preferably below 16 mol %. Above 16 mol %, the UV stability becomes significantly poorer because of the amorphous nature of the layer and above 20 mol % it is no longer possible to achieve the same level of IV stability as below 16 mol %, even with a further addition of UV stabilizer. Comonomers are all monomers apart from ethylene glycol and terephthalic acid (or dimethyl terephthalate). Preference is given to using not more than 2 comonomers at the same time. Isophthalic acid is particularly preferred as comonomer. A layer having a comonomer content of greater than 8 mol % (based on the polyester in this layer, or on the dicarboxylic acid component thereof) additionally preferably contains at least 1.5% by weight and particularly preferably more than 2.1% by weight of organic UV stabilizer, based on the total weight of the layer, in order to compensate for the poorer UV stability of layers having an increased comonomer content.

In a further particularly preferred embodiment, both surfaces of the polyester film have an anti-fog coating having a thickness of at least 60 nm, preferably at least 70 nm and in particular at least 80 nm, and not more than 150 nm, preferably not more than 130 nm and ideally not more than 120 nm. In this case, the refractive index of the anti-fog coating at a wavelength of 589 nm in the machine direction of the film is below 1.64, preferably below 1.60 and ideally below 1.58. The preferred transparency values of at least 94.5% can be achieved by means of the two-sided anti-fog coating. Owing to the use of a single coating composition, highly transparent films having very good permanent anti-fog properties (cold fog test and hot fog test) can be produced particularly economically in this way. This film is particularly suitable in greenhouses having a continuously high atmospheric humidity (condensation) since the formation of water droplets can be avoided on both sides of the film surface and the associated light scattering can be efficiently avoided by means of the two-sided anti-fog coating.

In order to achieve the permanent anti-fog effect according to the invention, the polyester film has to be provided with a permanent anti-fog coating on at least one side. The permanent anti-fog properties of the surface are achieved when the formation of fine water droplets (e.g. condensation in the greenhouse) on the surface of the polyester film is not observed and at the same time the resistance of the coating to being washed off is good. A minimum prerequisite for good anti-fog properties is a high surface energy or a low contact angle α (see methods part). The anti-fog properties are sufficiently good when the surface tension of the anti-fog surface is at least 45 mN/m, preferably at least 55 mN/m and particularly preferably at least 60 mN/m. A permanent anti-fog effect can be achieved for a time of at least one year in the cold fog test and for at least three months in the hot fog test (desired ratings A and B; see methods part or table of examples). The permanent anti-fog properties according to the invention and a transparency of at least 92% are achieved by use of the coating composition described below. The anti-fog coating is formed by drying of a coating composition. In the case of a multilayer embodiment with an antireflection-modified coextruded layer, the permanent anti-fog coating is applied to the surface of the polyester film opposite the antireflection-modified coextruded layer.

The anti-fog coating composition according to the invention is an aqueous solution comprising a) a polyvinyl alcohol or a hydrophilic PVOH copolymer, b) an inorganic, hydrophilic material, c) a crosslinker.

Conventional anti-fog coatings contain surfactants in order to achieve permanent anti-fog properties. However, the use of surfactants is disadvantageous, particularly in the case of production by means of in-line processes. It has surprisingly been found that the use of polyvinyl alcohols or hydrophilic PVOH copolymers in the anti-fog coating leads to good permanent anti-fog properties and makes it possible to dispense with the use of surfactants in this anti-fog coating.

The component a) is a polyvinyl alcohol or a hydrophilic PVOH copolymer. The use of polyvinyl alcohols having a moderate to high degree of hydrolysis of 60-95%, preferably 70-90%, e.g. Gohsenol KP08R (degree of hydrolysis 71-73.5%) is advantageous so that solubility in water is ensured without the raw material being able to be washed off too quickly. Copolymers having a lower degree of hydrolysis are also possible when a group which simplifies solubility in water is present instead of the acetate group. In this case, part of the acetate groups in the polyvinyl alcohol is replaced by polyethylene glycol. An example of such a polyvinyl alcohol is GohsenX-LW200, which despite a degree of hydrolysis of only 46-53% has excellent solubility in water.

The polyvinyl alcohol copolymer according to the present invention is an alkanediol-polyvinyl alcohol copolymer. The alkanediol-polyvinyl alcohol copolymer is preferably selected from the group consisting of propanediol-polyvinyl alcohol copolymer, butanediol-polyvinyl alcohol copolymer, pentanediol-polyvinyl alcohol copolymer and mixtures thereof. The polyvinyl alcohol copolymer is particularly preferably butanediol-polyvinyl alcohol copolymer.

These particularly preferred copolymers are marketed under the tradename Nichigo G-Polymer and are butanediol-vinyl alcohol copolymers which at degrees of hydrolysis of 86-99% are readily soluble in water, display little tendency to foaming in aqueous medium and are readily wetted by water droplets when present as part of a coating on PET, e.g. the G-Polymer OKS8089.

In general, polyethylene glycol or cellulose ethers would also be conceivable, but these substances are often difficult to apply as coatings to the film in the in-line process, or they have adverse effects on the regenerability/recyclability of the film. Polyethylene glycols have a decomposition temperature which is in the region of the production temperatures of polyester film, so that undamaged production is not possible. If the films are provided with a coating containing cellulose ethers, this leads to poor regenerability of the film since the temperatures of over 250° C. occurring during regeneration lead to decomposition of the cellulose ethers, which shows up in a clearly perceptible yellow color of the resulting recycled material. Recycled material produced in this way can no longer be used for producing films for which optical properties are a key qualification.

The component a) is used in a concentration of from 2 to 10% by weight and preferably from 4 to 8% by weight, based on the total solids content of the coating solution. It displays excellent film-forming properties, especially in the in-line process.

As component b), it is possible to use inorganic and/or organic particles such as pyrogenic silica, inorganic alkoxides containing silicon, aluminum or titanium (as described in DE 698 33 711), kaolin, crosslinked polystyrene or acrylate particles. Preference is given to using porous $SiO_2$, e.g. amorphous silica, and also pyrogenic metal oxides or aluminum silicates (zeolites). These are used in a concentration of from 1 to 6% by weight (based on the coating dispersion), preferably from 2 to 4% by weight (based on the coating dispersion). Furthermore, $SiO_2$ nanoparticles can be used in addition or exclusively in order to increase the wettability of the film surface even further and to absorb sufficient water for a homogeneous water film to be formed, resulting in the anti-fog impression. Hydrophilic pyrogenic silicas are particularly suitable.

Furthermore, the coating dispersion can contain a component c) in a concentration of from 2 to 10% by weight (based on the coating dispersion), preferably from 4 to 8% by weight (based on the coating dispersion). This component is preferably an oxazoline-modified polymer (oxazoline-based crosslinker) which is obtainable, for example, under the tradename EPOCROS WS-500 and in particular EPO-CROS WS-700 from Nippon Shokubai. The use of the crosslinker in the amounts mentioned improves the abrasion resistance of the coating.

Further surfactants can optionally be added to the dispersion in order to improve the anti-fog effect. However, this is at the expense of the disadvantage of no longer being able to apply the permanent anti-fog coating to the films as readily in an in-line process. It is presumed that the surfactants can, in contrast to the other polymeric constituents of the coating dispersion, evaporate during film production and thus no longer be available for the intended purpose. This situation can be countered in the off-line process by preselection of gentler drying conditions. However, an off-line process has the disadvantage of the additional outlay in the form of at least one further processing step, so that further surfactants should be dispensed with if possible. Possible surfactants for the further addition encompass, for example, polyalkylene glycol ethers, Polysorbat 80 (polyoxyethylene (20)-sorbitan monooleate), sulfosuccinic esters, alkyl sulfates, alkyl benzenesulfates. Possible added amounts are up to 7% by weight in the coating dispersion, but preferably <0.2% by weight and ideally 0% by weight.

Furthermore, the coating solution can contain one or more antifoams. The use of antifoams has been found to be advantageous especially in the case of highly concentrated dispersions, since foam formation at the application unit can be reduced thereby, ensuring a stable production process. However, it has to be accepted that the addition of antifoams or of further amphoterics or surfactants can potentially lead to coating inhomogeneities on the film surface. The use of such additives therefore has to be considered carefully and the amounts added should be kept small.

Above the limits according to the invention, the economics of the film are impaired because of the use of an excess of coating components. Below the limits according to the invention, the desired anti-fog properties are obtained to only a limited extent (not permanently) since the desired coating thickness is too low. If the limits according to the invention are adhered to, the reaction product of the coating dispersion gives a good anti-fog effect, a high washing-off resistance and a high hydrophilicity, especially on a biaxially oriented polyester film.

Production Process

The production process for polyester films is described, for example, in "Handbook of Thermoplastic Polyesters, Ed. S. Fakirov, Wiley-VCH, 2002" or in the chapter "Polyesters, Films" in the "Encyclopedia of Polymer Science and Engineering, Vol. 12, John Wiley & Sons, 1988". The preferred process for producing the film contains the following steps. The raw materials are each melted in one extruder per layer and extruded through a single-layer or multilayer slit die onto a cooled offtake roller. This film is subsequently reheated and stretched ("oriented") in the longitudinal direction (MD or machine direction) and transverse direction (TD) or in the transverse and longitudinal direction. The film temperatures in the orienting process are generally from 10 to 60° C. above the glass transition temperature Tg of the polyester used, and the stretching ratio of the longitudinal stretching is usually from 2.5 to 5.0, in particular from 3.0 to 4.5, and that of the transverse stretching is from 3.0 to 5.0, in particular from 3.5 to 4.5. The longitudinal stretching can also be carried out simultaneously with the transverse stretching (simultaneous stretching) or in any conceivable sequence. The film is thermofixed at oven temperatures of from 180 to 240° C., in particular from 210 to 230° C. The film is subsequently cooled and rolled up.

The biaxially oriented polyester film according to the invention is preferably coated in-line, i.e. the coating is applied during the film production process before the longitudinal and/or transverse orienting. In order to achieve good wetting of the polyester film with the aqueous coating composition, the surface is preferably firstly corona-treated. The coating can be applied using a suitable conventional process, for example by means of a slit caster or a spray process. Application of the coating by means of the "reverse gravure-roll coating" process, in which the coating can be applied extremely homogeneously in applied weights (wet) in the range from 1.0 to 3.0 g/m², is particularly preferred. Application by the Meyer-Rod process, by means of which greater coating thicknesses can be achieved, is likewise preferred. The coating on the finished film preferably has a thickness of at least 60 nm, preferably at least 70 nm and in particular at least 80 nm. The in-line process is more economically attractive since the anti-fog and antireflection coatings can be applied simultaneously in a two-sided coating operation, so that one process step (see below: off-line process) can be saved.

In a further process, the above-described coatings are applied by means of off-line technology. Here, the antireflection coating and/or anti-fog coating according to the present invention are applied by means of off-line technology to the appropriate surface of the polyester film using a gravure roller (forward gravure) in an additional process step subsequent to film production. The maximum limits are determined by the process conditions and the viscosity of the coating dispersion and the upper limit is fixed by the processability of the coating dispersion. Whereas it is in principle possible to apply both the anti-fog coating and the antireflection coating on the same surface side of the base layer B, it has been found to be disadvantageous to apply the anti-fog coating to a previously applied coating (anti-fog coating on top of an antireflection coating) since firstly the consumption of material increases and secondly a further process step is required, resulting in the economics of the film being adversely affected. In some in-line coating processes, the particularly preferred coating thicknesses cannot be attained because of the high viscosity of the coating dispersion. In this case, the off-line coating process can be selected since dispersions having lower solids contents and higher wet applied amounts can be processed here, as a result of which a simpler processability is obtained. In addition, higher coating thicknesses can be achieved in off-line coating processes, which has been found to be advantageous in applications which have demanding requirements in respect of the life of the anti-fog effect. Thus, coating thicknesses of ≥80 nm can be achieved particularly simply by the off-line process, making it possible to achieve a better permanent anti-fog effect but no further increase in the transparency.

Use

The films of the invention are outstandingly suitable as highly transparent convection barriers, in particular for producing energy saving mats in greenhouses. Here, the film is usually cut into narrow strips which are subsequently used together with polyester yarn (this also has to be UV-stabilized) to produce a woven fabric/lay-up which is hung up in the greenhouse. The strips of film according to the invention can be combined with strips of other films (in particular with films having a light-scattering effect: or a further increase in transparency).

As an alternative, the film itself (full area, no woven fabric) can also be installed in the greenhouse.

Methods

To characterize the raw materials and the films, the following measurement methods were utilized for the purposes of the present invention:

UV/Vis Spectra and Transmission at Wavelength x

The films were measured in transmission in a UV/Vis twin-beam spectrometer (LAMBDA® 950S) from Perkin Elmer USA. A film specimen having a size of about (3×5) cm is for this purpose placed using a flat specimen holding device in the beam path perpendicularly to the measurement beam. The measurement beam goes via an Ulbricht sphere to the detector where the intensity is determined in order to determine the transparency at the desired wavelength.

Air serves as background. The transmission is read off at the desired wavelength.

Turbidity, Transparency

The test serves to determine the turbidity and transparency of polymer films for which the optical clarity or turbidity is important for the use. The measurement is carried out on the HAZEGARD® Hazemeter XL-21 1 from BYK Gardner in accordance with ASTM D 1003-61.

Determination of the Refractive Index as a Function of the Wavelength

In order to determine the refractive index of a film substrate and a coating applied thereto as a function of the wavelength, use is made of spectroscopic ellipsometry.

The analyses were carried out by a method based on the following reference:

J. A. Woollam et al.: Overview of variable-angle spectroscopic ellipsometry (VASE): I. Basic theory and typical applications. In: Optical Metrology, Proc. SPIE, Vol. CR 72 (Ghanim A. A.-J., Ed.); SPIE—The International Society of Optical Engineering, Bellingham, WA, USA (1999), p. 3-28.

For this purpose, the base film without coating or modified coextruded side was firstly analyzed. To suppress the rear side reflection, the rear side of the film was roughened using an abrasive paper having a very fine abrasive particle size (for example P1000). The film was subsequently measured using a spectroscopic ellipsometer, here an M-2000 from J. A. Woollam Co., Inc., Lincoln, NE, USA, which is equipped with a rotating compensator. The machine direction of the specimen was parallel to the light beam. The measured wavelength was in the range from 370 to 1000 nm, and the measurement angles were 65, 70 and 75°.

The ellipsometric data ψ and Δ were subsequently replicated using a model. The Cauchy model $$n(\lambda) = A + \frac{B}{\lambda^2} + \frac{C}{\lambda^4}$$

(wavelength λ in μm) was suitable for this purpose in the present case. The parameters A, B and C are varied so that the data agree as well as possible with the measured spectrum ψ (amplitude ratio) and Δ (phase ratio). To test the quality of the model, the MSE value, which should be as small as possible, can be included and the model compared with measured data (ψ(λ) and Δ(λ)).

$$MSE = \sqrt{\frac{1}{3a-m}\sum_{i=1}^{a}\left[(N_{E,i}-N_{G,i})^2 + (C_{E,i}-C_{G,i})^2 + (S_{E,i}-S_{G,i})^2\right]} \cdot 1000$$

a=number of wavelengths, m=number of fit parameters, N=(2ψ), C=sin(2ψ) cos(Δ), S=sin(2ψ) sin(Δ)

The Cauchy parameters A, B and C obtained for the base film make it possible to calculate the refractive index n as a function of the wavelength, valid in the measured range from 370 to 1000 nm.

The coating or a modified coextruded layer can be analyzed analogously. The rear side of the film also has to be roughened, as described above, for analysis of the coating and/or the coextruded layer. The Cauchy model can likewise be used here in order to describe the refractive index as a function of the wavelength. However, the respective layer is now located on the previously known substrate since the parameters of the base film are now already known, if they are to be kept constant in the modelling, which is taken into account in the respective evaluation software (COMPLE-TEEASE® or WVASE®). The thickness of the layer influences the spectrum obtained and has to be taken into account in the modelling.

Surface Energy

The surface energy (surface free energy) was determined in accordance with DIN 55660-1,2. Water, 1,5-pentanediol and diiodomethane serve as test liquids. The determination of the static contact angles between the coated film surface and tangents of the surface contour of a horizontal liquid droplet was carried out by means of the measuring instrument DSA-100 from Krüss GmbH, Hamburg, Germany. The determination took place at 23° C.±1° C. and 50% relative humidity on film specimens which had been discharged and previously conditioned in a standard atmosphere for at least 16 hours. The evaluation of the surface energy σs (total) by the method of Owens-Wendt-Rabel-Kaelble (OWRK) was carried out by means of the Software Advance version 4 belonging to the instrument using the following parameters of the surface tension for the three standard liquids:

TABLE 1

Parameters of the surface tension for three standard liquids.

| Liquid | Surface tension [mN/m] | | |
| --- | --- | --- | --- |
| | $\sigma_L$ (Total) | $\sigma_{L,D}$ (Disperse) | $\sigma_{L,P}$ (Polar) |
| Distilled water | 72.8 | 21.8 | 51.0 |
| 1,5-Pentanediol | 43.3 | 27.6 | 15.7 |
| Diiodomethane | 50.8 | 49.5 | 1.3 |

Determination of the Anti-Fog Effect

Cold fog test: the anti-fog properties of the polyester films are determined as follows: in a laboratory maintained at 23° C. and 50% relative atmospheric humidity, film specimens are sealed onto a meal tray (length about 17 cm, width about 12 cm, height about 3 cm) comprised of amorphous polyethylene terephthalate (=APET) and containing about 50 ml of water. The trays are stored in a refrigerator maintained at 4° C. and stood up at an angle of 30° and taken out for assessment after 12 hours, 24 hours, 1 week, 1 month and 1 year. The condensate formation on cooling of the air having a temperature of 23° C. to refrigerator temperature is tested. A film provided with an effective anti-fog agent is transparent even after condensate formation since the condensate forms a coherent, transparent film. Without an effective anti-fog agent, the formation of a fine mist of droplets on the film surface leads to a reduced transparency of the film; in the most unfavorable case, the contents of the meal tray are no longer visible.

A further method of examination is the hot steam or hot fog test. A QCT condensation tester from Q-Lab is used for this purpose. This simulates the anti-fog effects of climatic moisture influences by condensing hot water directly on the film. Results brought about by moisture over months or years can in this way be reproduced in a few days or weeks. For this purpose, the water is heated to 60° C. in the QCT condensation instrument and the film is clamped into the appropriate holder. The clamped-in film has an angle of inclination of about 30°. The assessment is the same as described above. The long-term anti-fog effect or the washing-off resistance of the film can be tested in this test since the vapor condenses continually on the film and runs and/or drips off again. Readily soluble substances are thus washed off and the anti-fog effect decreases. This test is likewise carried out in a laboratory maintained at 23° C. and 50% relative atmospheric humidity.

The assessment of the anti-fog effect (anti-fog test) is effected visually.

Rating:

A A transparent film on which there is no visible water and which is completely transparent, excellent B Some water droplets distributed randomly and irregularly on the surface, discontinuous water film, acceptable C A complete layer of large transparent water drops, poor transparency, lens formation, droplet formation, poor D An opaque or transparent layer of large water drops, cannot be seen through, poor light transparency, very poor SV Value (Standard Viscosity)

The standard viscosity in dilute solution SV was measured in an Ubbelohde viscometer at (25±0.05) ° C. using a method based on DIN 53 728 part 3. Dichloroacetic acid (DCA) was used as solvent. The concentration of the dissolved polymer was 1 g of polymer/100 ml of pure solvent. The dissolution of the polymer occurred at 60° C. for 1 hour. If the samples were not completely dissolved after this time, up to two further dissolution experiments at 80° C. for 40 minutes in each case were carried out and the solutions were subsequently centrifuged at a rotational speed of 4100 min$^{-1}$ for 1 hour.

The dimensionless SV value is determined from the relative viscosity ($\eta_{rel}=\eta/\eta_s$) as follows:

$$SV = (\eta_{rel}-1) \times 1000$$

The proportion of particles in the film or polymer raw material was determined by means of ash determination and corrected for by weighing out a corresponding additional amount; i.e.:

Amount weighed out=(amount corresponding to 100% of polymer)/[(100 particle content in % by weight)/100)]

EXAMPLES

To produce the films described below, the following starting materials were used:

PET1=polyethylene terephthalate raw material derived from ethylene glycol and terephthalic acid and having an SV of 820 and a DEG content of 0.9% by weight (diethylene glycol content as monomer).

PET2=PCR raw material produced from PET flakes obtained from "PET post-consumer articles" (mainly bottles and trays comprised of PET) and obtainable, for example, under the tradename MOPET® (R) from Morssinkhof. The SV is increased in comparison with conventional PET because of the condensation process and is often above 950, DEG content about 1.5% by weight.

PET3=polyethylene terephthalate raw material derived from ethylene glycol and dimethyl terephthalate and having an SV of 820 and a DEG content of 0.9% by weight (diethylene glycol content as monomer) and 1.5% by weight of silicon dioxide pigment SYLOB-LOC® 46 having a d50 of 2.5 μm. Produced by means of the PTA process. Catalyst: potassium titanyl oxalate containing 18 ppm of titanium. Transesterification catalyst zinc acetate.

PET4=polyethylene terephthalate raw material having an SV of 700 and containing 20% by weight of TINU-VIN® 1577. The UV stabilizer has the following composition: 2-(4,6-diphenyl-1,3,5-triazin-2-yl)-5-(hexyl)oxyphenol (TINUVIN® 1577 from BASF, Ludwigshafen, Germany). TINUVIN® 1577 has a melting point of 149° C. and is thermally stable at 330° C.

PET5=polyethylene terephthalate raw material having an SV of 710 and containing 25 mol % of isophthalic acid as comonomer.

The abovementioned raw materials were melted in one extruder per layer and extruded through a three-layer slit die (ABA layer sequence) onto a cooled offtake roller. The amorphous prefilm obtained in this way was then firstly oriented longitudinally. The longitudinally oriented film was corona-treated in a corona-discharge apparatus and then coated with the above-described solution by reverse gravure coating. A gravure roller having a volume of 6.6 cm³/m² was used. The film was then dried at a temperature of 100° C. and subsequently oriented transversely, fixed and rolled up. The conditions in the individual process steps were:

Longitudinal orientation: Temperature: 80-115° C.
    Longitudinal stretching ratio: 3.8
Transverse orientation: Temperature: 80-135° C.
    Transverse stretching ratio: 3.9
Fixing: 2 s at 225° C.

Example 1

Covering layers (A) and (C): mixture of
10% by weight of PET4
7.2% by weight of PET3
82.8% by weight of PET1
Base layer (B): mixture of 90% by weight of PET1
10% by weight of PET4
Coating on covering layer C (coated on one side):
Coating 1:
The following composition of the coating solution was used
    84.3% by weight of deionized water
    5.82% by weight of G-POLYMER® OKS 8089 (MCPP Europe GmbH)
    6.05% by weight of EPOCROS® WS700 (Nippon Shokubai Co., Ltd.)
    3.83% by weight of AERODISP® W7622 (Evonik Resource Efficiency GmbH)

The individual components were slowly added while stirring to deionized water and stirred for at least 30 minutes before use. The solids content was 15% by weight. The thickness of the dry coating was 80 run.

Unless indicated otherwise, the coating is applied by the in-line process. The properties of the resulting film are shown in table 2.

Example 2

In contrast to example 1, the second covering layer (A) was also coated.

Coating on the covering layer (C): as in example 1

The individual components were slowly added while stirring to deionized water and stirred for at least 30 minutes before use.

The solids content was 15% by weight. The thickness of the dry coating was 80 nm.

Example 3

In contrast to example 1, the base layer was produced using PCR raw material. Traces of very small dirt particles originating from the PCR raw material could be seen in the resulting film.

Examples 4 and 5

The composition of the film layers and the coatings are given in Table 2. The properties of the resulting films are also shown in table 2. The United States equivalent of EP 0144948, noted in Table 2, is U.S. Pat. No. 4,571,363, which is hereby incorporated herein in its entirety by reference.

Comparative Example 1

Coating 2:
Coating as in EP 1 777 251 A1 consisting of a hydrophilic coating in which the product of drying of the coating composition contains water, a sulfo polyester, a surfactant and optionally an adhesion-promoting polymer. These films have a hydrophilic surface which prevents short-term fogging of the films with water droplets. The following composition of the coating solution was used:
    1.0% by weight of sulfo polyester (copolyester of 90 mol % of isophthalic acid and 10 mol % of sodium sulfoisophthalic acid and ethylene glycol)
    1.0% by weight of acrylate copolymer consisting of 60% by weight of methyl methacrylate, 35% by weight of ethyl acrylate and 5% by weight of N-methylolacrylamide
    1.5% by weight of diethylhexylsulfosuccinate sodium salt (LUTENSIT® A-BO BASF AG).

The properties of the film obtained in this way are shown in Table 2. The United States equivalent of EP 1 777 251 A1 is US Patent Application Publication No. 2007/0087188, which is hereby incorporated herein in its entirety.

TABLE 2

Properties of the films of the examples

| | | Example 1 | Example 2 | Example 3 | Example 4 | Example 5 | Comparative example 1 |
|---|---|---|---|---|---|---|---|
| Layer | Film thickness | 19 | 19 | 19 | 19 | 19 | 19 |
| | Thickness A | 1 | 1 | 1 | 1 | 1 | 1 |
| | Thickness B | 17 | 17 | 17 | 17 | 17 | 17 |
| | Thickness C | 1 | 1 | 1 | 1 | 1 | 1 |
| Coating on side A | | | Dry thickness 75 nm. Anti-fog coating: 1 | Dry thickness 80 nm. Anti-fog coating: 1 | Dry thickness 75 nm. Acrylate coating and application method as in ex. 1 of EP 0144948 | | |
| Coating on side C | | Dry thickness 8 0 nm. Anti-fog coating: 1 | Dry thickness 8 0 nm. Anti-fog coating: 1 | Dry thickness 80 nm. Anti-fog coating: 1 | Dry thickness 80 nm. Anti-fog coating: 1 | Dry thickness 80 nm. Anti-fog coating 1 | Dry thickness 40 nm. Anti-fog coating: 2 |
| A layer | PET 1 | 82.8 | 82.8 | 82.8 | 82.8 | 32.8 | 82.8 |
| | PET 2 | | | | | | |
| | PET 3 | 7.2 | 7.2 | 7.2 | 7.2 | 7.2 | 7.2 |
| | PET 4 | 10.0 | 10.0 | 10.0 | 10.0 | 10.0 | 10.0 |
| | PET 5 | 0 | 0 | 0 | 0 | 50 | 0 |
| B layer | PET 1 | 90 | 90 | 60 | 90 | 90 | 90 |
| | PET 2 | | | 30 | | | |
| | PET 4 | 10 | 10 | 10 | 10 | 10 | 10 |
| C layer | PET 1 | 82.8 | 82.8 | 82.8 | 82.8 | 82.8 | 82.8 |
| | PET 2 | | | | | | |
| | PET 3 | 7.2 | 7.2 | 7.2 | 7.2 | 7.2 | 7.2 |
| | PET 4 | 10.0 | 10.0 | 10.0 | 10.0 | 10.0 | 10.0 |
| Transparency (sheet middle) | in % | 92 | 94.8 | 94.9 | 94.2 | 93.7 | 91.2 |
| Turbidity | | 8.3 | 20.2 | 21.7 | 14.3 | 10.6 | 10.0 |
| UV stability UTS | in % | 70 | 70 | 63 | 72 | 65 | 68 |
| Surface energy &simga$_s$ (total) (side C) | [mN/m] | 58 | 58 | 61 | 58 | 59 | 49 |
| Cold fog test | | A | A | A | A | A | C |
| Hot fog test | | A | A | A | A | A | D |

That which is claimed:

1. A coated single-layer or multilayer polyester film having a transparency of at least 92%, with the polyester film having a first surface and a second surface, said polyester film comprising a permanent anti-fog coating applied to at least one of the surfaces of the polyester film, wherein said permanent antifog coating is a single layer of a reaction product of a dispersion of an antifog coating composition that comprises at least one water-soluble polymer, an inorganic, hydrophilic material and a crosslinker, wherein the water-soluble polymer is a polyvinyl alcohol or a hydrophilic polyvinyl alcohol copolymer present in an amount of from 4 to 10% by weight (based on the coating dispersion);

wherein an inorganic, hydrophilic material is present in an amount of from 1 to 6% by weight (based on the coating dispersion);

wherein the crosslinker is present in an amount of from 2 to 10% by weight (based on the coating dispersion); and said antifog coating comprises one or more of alkanediol-polyvinyl alcohol copolymer as water-soluble polymer or an oxazoline-based crosslinker as crosslinker.

2. The coated polyester film as claimed in claim 1 comprising a base layer (B) and optionally a covering layer (A) or a covering layer (A) and a covering layer (C), wherein the covering layer (A) has, if present, been applied to the first or second surface of the polyester film and the covering layer (C) has, if present, been applied to the surface of the polyester film opposite the covering layer (A).

3. The coated polyester film as claimed in claim 2, wherein the base layer (B) and, if present, the covering layers (A) and (C) comprise a UV stabilizer.

4. The coated polyester film as claimed in claim 3, wherein the UV stabilizer is selected from the group consisting of triazines, benzotriazoles, and benzoxazinones, where the base layer and, if present, the covering layers (A) and (C) contain the UV stabilizer in an amount of from 0.3 to 3% by weight, based on the weight of the respective layer.

5. The coated polyester film as claimed in claim 4, wherein the UV stabilizer is triazine, and the base layer and, if present, the covering layers (A) and (C) contain the UV stabilizer in an amount of from 0.75 to 2.8% by weight, based on the weight of the respective layer.

6. The coated polyester film as claimed in claim 1, wherein the thickness of the coated polyester film is at least 10 μm and not more than 40 μm.

7. The coated polyester film as claimed in claim 6, wherein the thickness of the coated polyester film is at least 14 μm and not more than 23 μm.

8. The coated polyester film as claimed in claim 6, wherein the thickness of the coated polyester film is at least 14.5 μm and not more than 20 μm.

9. The coated polyester film as claimed in claim 1, wherein the coated polyester film comprises a base layer and the base layer comprises a thermoplastic polyester to an extent of at least 70% by weight,
wherein the thermoplastic polyester comprises to an extent of at least 90 mol % of units derived from ethylene glycol and terephthalic acid or of units derived from ethylene glycol and naphthalene-2,6-dicarboxylic acid.

10. The coated polyester film as claimed in claim 9, wherein the thermoplastic polyester comprises to an extent of at least 95 mol % of units derived from ethylene glycol and terephthalic acid or of units derived from ethylene glycol and naphthalene-2,6-dicarboxylic acid.

11. The coated polyester film as claimed in claim 1, wherein the polyester film contains particles selected from the group consisting of calcium carbonate, amorphous silica, talc, magnesium carbonate, barium carbonate, calcium sulfate, barium sulfate, lithium phosphate, calcium phosphate, magnesium phosphate, aluminum oxide, LiF, calcium salts, barium salts, zinc salts or manganese salts of dicarboxylic acids, titanium dioxide, kaolin and particulate polymers.

12. The coated polyester film as claimed in claim 11, wherein the particulate polymers are crosslinked polystyrene or acrylate particles.

13. The coated polyester film as claimed in claim 1, wherein the anti-fog coating has a lower refractive index than the polyester film.

14. The coated polyester film as claimed in claim 1, wherein the anti-fog coating has a thickness of at least 60 nm and not more than 150 nm.

15. The coated polyester film as claimed in claim 14, wherein the anti-fog coating has a thickness of at least 70 nm and not more than 130 nm.

16. The coated polyester film as claimed in claim 14, wherein the anti-fog coating has a thickness of at least 80 nm and not more than 120 nm.

17. The coated polyester film as claimed in claim 1, wherein an anti-fog coating has been applied to the first or second surface of the polyester film and the surface of the polyester film opposite the anti-fog coating has an antireflection modification which
(1) is an antireflection coating or
(2) is a covering layer modification.

18. The coated polyester film as claimed in claim 17, wherein the coated polyester film comprises a base layer B and the covering layer modification is a coextruded layer on the base layer B, and
the covering layer modification comprises a polyester which has a lower refractive index than the polyester of the base layer B.

19. The coated polyester film as claimed in claim 17, wherein the anti-fog coating has a thickness of at least 30 nm and not more than 150 nm.

20. The coated polyester film as claimed in claim 19, wherein the anti-fog coating has a thickness of at least 40 nm.

21. The coated polyester film as claimed in claim 19, wherein the anti-fog coating has a thickness of at least 50 nm.

22. A process for producing a coated polyester film as claimed in claim 1, said process comprising
producing the polyester film by extruding
and biaxially orienting,
applying an anti-fog coating composition wet in-line to the polyester film and
thermofixing the coated polyester film and rolling up the thermofixed coated film.

23. A process for producing a coated polyester film as claimed in claim 1, said process comprising
producing the polyester film by extruding, biaxially orienting, thermofixing and rolling up the films, and
subsequently applying an anti-fog coating composition wet to the polyester film off-line by means of conventional coating technology and
subsequently drying the coated polyester film and rolling up the dried coated film.

24. Energy saving mats in greenhouses comprising the coated polyester film as claimed in claim 1.

25. The coated polyester film as claimed in claim 1, wherein said inorganic, hydrophilic material is porous $SiO_2$, pyrogenic metal oxides or aluminum silicates.

26. The coated polyester film as claimed in claim 1, wherein said inorganic, hydrophilic material consists of amorphous silica or pyrogenic silica.

27. The coated polyester film as claimed in claim 1, wherein said film comprises said permanent anti-fog coating on said first and said second surface, and said coated film exhibits a transparency of at least 94.5%.

* * * * *